July 25, 1967  TADASHI YOSHIDA  3,332,843
METHOD OF PRODUCING AN ANTIBIOTIC QUINOMYCIN B
Filed Nov. 20, 1962
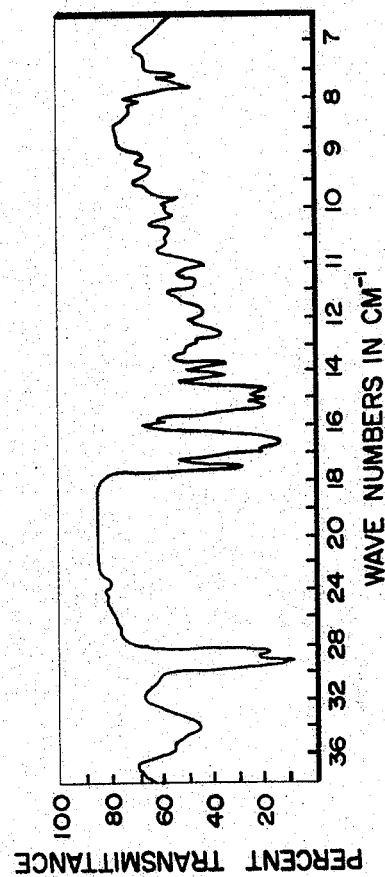
Tadashi Yoshida,
INVENTOR
BY Wenderoth,
Lind and Ponack, ATTORNEYS

United States Patent Office 3,332,843
Patented July 25, 1967

3,332,843
METHOD OF PRODUCING AN ANTIBIOTIC
QUINOMYCIN B
Tadashi Yoshida, Nishinomiya-shi, Hyogo Prefecture, Japan, assignor to Shionogi & Co., Ltd., Osaka, Japan
Filed Nov. 20, 1962, Ser. No. 238,992
Claims priority, application Japan, Nov. 21, 1961, 36/42,547
9 Claims. (Cl. 167—65)

This invention relates to the production of an antibiotic designated "Quinomycin B" useful in inhibiting gram-positive microorganisms and, more particularly, to its production by fermentation, to methods for its recovery and concentration from crude solutions, such as fermentation broths, and to processes for its purification.

The antibiotic is produced during the cultivation under controlled conditions of a new species of microorganism known as Streptomyces Number 1752 in the collection of Shionogi Research Laboratory, Shionogi & Co., Ltd., Fukushima-ku, Osaka, Japan, and on deposit with the American Type Culture Collection under the accession number ATCC No. 14892.

The organism shows the following microbiological characteristics.

Morphological characteristics

The morphological properties of the strain were observed on glucose-asparagin agar after incubation at 28° C. for 14 days. The aerial mycelium shows good growth. On the macroscopic observation, it is powdery to velvety. The microscopic observation of the aerial mycelium shows the latter to be characterized by forming main stem with irregular side branch. Most of the sporophores are loops, and hooks are observed partially. The shape of conidia is spherical to oval.

Cultural characteristics

The observations were made after incubation at 28° C. for 14 days.

Biochemical characteristics

The observations were made after incubation at 28° C. for 14 days, unless other indicated.

| Property | Results |
| --- | --- |
| Acid formation from glucose (28° C., 10 days). | Positive. |
| Melanoid pigment (28° C., 10 days). | Positive (strong). |
| Tyrosinase reaction | Do. |
| Nitrate reduction | Positive. |
| Gelatin liquefaction | Negative. |
| Milk peptonization | Positive (rapidly). |
| Starch hydrolysis | Positive. |
| Utilization of carbon sources | Positive: Glucose, D-mannitol, L-rhamnose, lactose, inositol, succrose, raffinose, glycerol, D-mannose, D-galactose, maltose. Negative: L-arabinose, D-xylose, D-fructose, salicin, insulin. |
| Utilization of nitrogen sources | Positive: DL-alanine, L-asparagine, L-histidine, glutamine, glycine, L-arginine, L-proline, DL-valine, L-leucine, L-phenylalanine, DL-methionine, sodium nitrate, ammonium chloride, ammonium phosphate, ammonium nitrate, ammonium sulfate. Negative: urea, sodium nitrite. |

Among the many species of Streptomyces described in Bergey's "Manual of Determinative Bacteriology," Waksman and Lechevalier's "Actinomycetes and Their Antibiotics" and other literatures, *Streptomyces echinatus* Corbaz et al. [Helv. chim. Acta., 40, 199 (1957)], appears

| Medium | Growth | Sporulation | Colony Edge | Colony Surface | Aerial mycelium | Substratum mycelium | Soluble pigment |
| --- | --- | --- | --- | --- | --- | --- | --- |
| Glucose asparagine agar. | Good | Good | | | Light brownish gray to brownish white. | Grayish brown. | Pale brown. |
| Czapek's agar | Good | Poor | Lacerate to fimbricate. | | White | Light brownish gray. | Pale yellowish brown. |
| Calcium malate agar | Good | Poor | Fimbricate to lacerate. | | Brownish white. | Light brownish gray. | None. |
| Glucose-Czapek solution. | Poor. Sediments on bottom. Few colonies adhere on glass wall in medium. | None | | | None | Light brownish gray. | None. |
| Nutrient agar | Poor | None | | Moist | None | Brown | Brown. |
| Glucose-bouillon agar | Moderate | Poor | Lacerate | Much folded | Brownish white. | Brown | Brown (chromogenic). |
| Potato medium | Good | Poor | | | Yellowish gray. | Brown | Brown to brownish black. |
| Glucose broth | Good. Ring type, trace sediments on bottom. | Poor | | | Poor | Brown | Brown (chromogenic). |
| Glucose peptone | Good | Moderate | Lacerate | Powdery | Brownish white. | Brown | Yellowish brown. |
| Gelatin medium | Poor | None | | | None | Poor | Dark brown. |
| Starch agar | Good | Poor | Lacerate | | Brownish white. | Light brownish gray. | None. |
| Litmus milk | Good. Growth type ring. | None | | | None | Yellowish gray. | |
| Cellulose agar | None | | | | | | |

NOTE.—Growth response to temperature (on glucose-asparagine agar): Good growth at 28° C. and 37° C., no growth at 45° C.

to be similar to the microorganism, Streptomyces No. 1752, in some microbiological characteristics including antibiotic production, chromogenic property, tyrosinase reaction, nitrate reduction, milk peptonization, cellulase reaction and starch hydrolysis. However, the strain is differentiated from the species, *Streptomyces echinatus*, in view of distinguishing characteristics shown in the following table:

| Property | Streptomyces No. 1752 | Streptomyces echinatus |
|---|---|---|
| Morphology, terminal portion of sporophore, on glucose-asparagine agar. | Open loops to hooks. | Typical short spirals. |
| Growth type on glucose broth. | Ring type. | Pellicle type. |
| Acid formation from glucose. | Positive. | Negative. |
| Growth temperature. | 45° C: no growth. | 45° C: growth. |
| Czapek's agar. | Growth: good. Color of aerial mycelium: white. Soluble pigment: pale brown. | Growth: poor. Color of aerial mycelium: pale brown. Soluble pigment: none. |
| Calcium malate agar. | Aerial mycelium: brownish white. Substratum mycelium: light brownish gray. | Aerial mycelium: yellowish white. Substratum mycelium: yellow. |
| Utilization of carbon source. | Positive: raffinose. Negative: L-arabinose, D-xylose, D-fructose, salicin. | Positive: L-arabinose, D-xylose, D-fructose, salicin. Negative: raffinose. |
| Utilization of nitrogen sources. | Negative: urea, sodium nitrite (poor growth). | Positive: urea, sodium ntirite. |

As a result of the above observations, the microorganism has been designated a new species.

It is to be understood that for the production of Quinomycin B the present invention is not limited to the use of Streptomyces No. 1752 per se. It is especially desired and intended to include the use of Quinomycin B-producing mutants or variants produced from the described organism by various means, such as X-rays, ultraviolet radiation and nitrogen mustards.

According to the method of the present invention, the antibiotic Quinomycin B is produced during cultivation of the microorganism, Streptomyces No. 1752, in an aqueous nutrient medium including isoleucine under aerobic conditions. The presence of isoleucine in the nutrient medium is critical for the successful accomplishment of the present invention. Although the isoleucine to be presented may be D-, L- or DL-form, the use of D- or DL-isoleucine is especially preferred. Isoleucine may be added to the nutrient medium when the latter is prepared or in the course of cultivation. The addition is usually made at the primary stage of fermentation, preferably about 24 hours after the start of cultivation. Even a very small amount of isoleucine results in the appreciably increased production of Quinomycin B. Usually, it is employed at a ratio of about 50 to about 250 γ per millilitre. The other nutrient materials that may be used include a carbon source, a nitrogen source and trace inorganic elements, each being usually employed in the fermentative production of antibiotics. Examples of suitable carbon sources are starch, glucose, glycerol, dextrin, maltose, sucrose, lactose, rhamnose and galactose. Suitable sources of nitrogen are, for example, meat extracts, peptone, glutamic acid, corn steep liquor, soybean meal, peanut meal, wheat gluten, cotton seed flour, NZ amine (enzymatic hydrolyzate of casein) and yeast extracts. Examples of suitable sources of inorganic elements are mineral salts, such as sodium chloride, potassium chloride, calcium carbonate, potassium phosphate, magnesium sulfate, zinc sulfate and manganese sulfate. Preferably, the nutrient medium may include dextrin as a carbon source, glutamic acid as a nitrogen source and inorganic salts. The nutrient medium may be adjusted to about pH 7 prior to inoculation of the microorganism. If excessive foaming is encountered during the fermentation, anti-foaming agents such as vegetable oils, lard oil and polypropyleneglycol may be added to the fermentation medium prior to or in the course of the fermentation. For the production of Quinomycin B, the microorganism may be usually cultivated in the aqueous nutrient medium at a temperature about 25 to about 30° C., preferably 27 to 28° C., for about 100 to about 300 hours under aerobic conditions. The maximum yields of the antibiotic Quinomycin B can be obtained within 160 to 240 hours of fermentation under optimum conditions of temperature and aeration.

After growth of the microorganism, the mycelium may be removed from the fermentation broth by using standard equipment, such as filter-presses and centrifuges, and then the antibiotic Quinomycin B may be recovered from the filtrate by a solvent extraction procedure. As the antibiotic Quinomycin B is retained by the mycelium in appreciable quantities, a solvent extraction procedure is preferably used to recover the antibiotic from the mycelium or the whole broth without the removal of the mycelium. Suitable extraction solvents include water-immiscible organic solvents, such as chloroform and ethyl acetate. Additionally, water-miscible organic solvents, such as methanol, ethanol, dioxane and acetone may be also employed for the extraction of the antibiotic from the mycelium. To the extract, preferably after the concentration, there may be added a petrolic solvent such as petroleum ether, petroleum benzin and ligroin to precipitate the crude active component.

The thus-obtained crude active component is further purified by suitable operations, such as recrystallization, chromatography and the like. Examples of suitable recrystallization solvents are chloroform, ethyl acetate, methanol, ethanol, benzene, etc. The preferred chromatographic adsorbents are alumina, silica gel, silicic acid and the like.

The antibiotic Quinomycin B is a white needle melting at 220.5 to 221.5° C. (decomp.). It is a neutral substance readily soluble in chloroform, ethyl acetate, dioxane and acetone, soluble in methanol and ethanol, slightly soluble in benzene and insoluble in water, ether and petroleum ether.

Elementary analysis for Quinomycin B is as follows: Found: C, 54.65%; H, 6.26%; N, 14.16%; S, 6.05%; O, 18.88% (by difference). The molecular weight of Quinomycin B is 1099 by the Rast method. The specific rotation of Quinomycin B is $[\alpha]_D^{25}$ $-300.1 \pm 2°$ ($c = 1.038\%$ in chloroform). The ultraviolet absorption spectrum in methanol is $\gamma_{max}.243$ m$\mu$ ($E_{1\,cm.}^{1\%} = 678$), 322 m$\mu$ ($E_{1\,cm.}^{1\%} = 118$). The infrared absorption spectrum in a Nujol mull shows the following characteristic frequencies (in reciprocal centimeters): 754, 775, 804, 817, 908, 932, 982, 1009, 1039, 1059, 1099, 1136, 1245, 1287, 1408, 1492, 1514, 1576, 1650, 1692, 1743, 3430 and 3540, shown in FIGURE 1.

It gives negative Ferric chloride, Ninhydrin, Ehrlich, Millon, Fehling, Potassium permanganate, Sakaguchi and Molisch tests. The acid hydrolysate gives a positive ninhydrin test.

Papergram bioautograph of Quinomycin B in a mixture of n-dibutyl ether, sym-tetrachloroethane and sodium o-cresotinate (10% aqueous solution) [2:1:3] shows an Rf value of 0.32.

From these and other physical and chemical properties, the following chemical structure is presently given to the antibiotic, Quinomycin B:

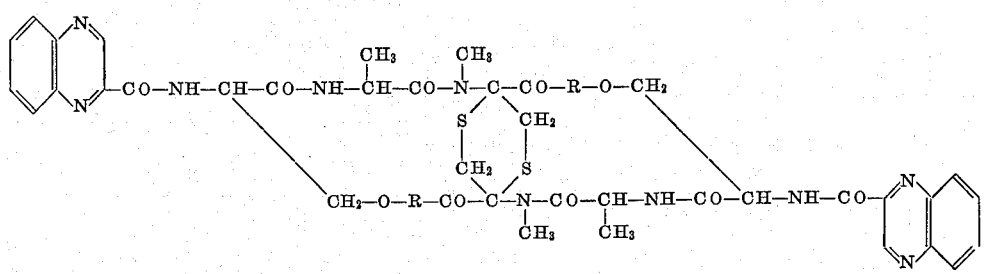

(Molecular weight for $C_{52}H_{64}O_{12}N_{12}S_2 = 1112$)

wherein R is the moiety represented by the formula:

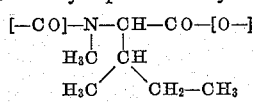

Quinomycin B shows activity against a variety of microorganisms and the following table illustrates its antibiotic spectrum:

| Test organisms: | Minimum inhibitory concentration ($\gamma$/ml.) |
|---|---|
| Staphylococcus aureus, 209 P | 0.02 |
| Bacillus subtilis | 0.01 |
| Bacillus anthacis | 0.05 |
| Sartina lutea | 0.005 |
| Diplococcus pneumoniae, type I | 0.005 |
| Diplococcus pneumoniae, V-type I | 0.005 |
| Diplococcus pneumoniae, type II | 0.005 |
| Diplococcus pneumoniae, type III | 0.005 |
| Streptococcus hemolyticus, D | 0.01 |
| Streptococcus hemolyticus, HA | 0.01 |
| Corynebacterium diphtheriae, S | 0.005 |
| Corynebacterium diphtheriae, T | 0.005 |
| Klebsiella pneumoniae | >50 |
| Escherichia coli, Umezawa | >50 |
| Salmonella typhosa | >50 |
| Salmonella paratyphi A | >50 |
| Shigella dysenteriae | 2.0 |
| Shigella sonnei | >50 |
| Pseudomonas aeruginosa | >50 |

From the preceding table, it is seen that Quinomycin B is highly active against gram-positive bacteria. Accordingly, it is useful in processes where it is desired to inhibit the growth of microorganisms. It is useful for sterilizing equipment, for example, surgical instrument. It is also useful in obtaining pure cultures of single organisms where a susceptible organism may be separated from a resistant one.

In addition to the antimicrobial activity, Quinomycin B also shows an inhibiting activity of growth of Hela-Cells at the concentration of 0.001$\gamma$ per millilitre. The intravenous acute toxicity ($LD_{50}$) for mice is about 0.054 mg. per kilogram of bodyweight.

The following examples are given solely for the purpose of illustration and are not to be construed as limitations of this invention, many variations of which are possible.

EXAMPLE 1

A seed medium is prepared from the following materials:

| | Grams per litre |
|---|---|
| Glycerol | 20.0 |
| Meat extract | 5.0 |
| Peptone | 5.0 |
| Sodium chloride | 3.0 |
| Calcium carbonate | 3.5 |
| pH adjusted to 7.0 | |

After sterilizing for 30 minutes at 120° C., the medium is inoculated with Streptomyces Number 1752, shaken for 48 hours at 27 to 28° C. and used as inoculum.

A nutrient medium is prepared from the following materials:

| | Grams per litre |
|---|---|
| L-glutamic acid | 2.00 |
| Dextrin | 20.00 |
| Dipotassium phosphate | 1.00 |
| Magnesium sulfate | 0.05 |
| Ferrous sulfate | 0.025 |
| Calcium chloride | 0.03 |
| pH adjusted to 7.2 | |

After sterilizing for 20 minutes at 120° C., the nutrient medium is inoculated with the above-prepared inoculum at a ratio of 4 milligrams per millilitre and agitated for 24 hours at 27 to 28° C. under aeration. To the resulting nutrient medium, there is added DL-isoleucine at a ratio of 100 $\gamma$ per millilitre, and the cultivation is further continued. The antibiotic concentration in the fermentation broth reaches around 30 $\gamma$ per millilitre within about 168 to about 192 hours after the start of cultivation.

Then, the fermentation broth is filtered. The collected mycelium is extracted with 80% aqueous acetone and the extract is condensed, adjusted to pH about 6 and shaken with ethyl acetate. The filtrate from the fermentation broth is adjusted to pH about 6 and shaken with a ⅕ volume of ethyl acetate. The above obtained ethyl acetate extracts are combined together and condensed. To the condensed product, there is added a 5 times volume of petroleum ether whereby yellowish white crystals are precipitated.

The thus-obtained crude crystals of Quinomycin B are dissolved in ethyl acetate and chromatographed on silicic acid. The eluate is crystallized from a mixture of chloroform and methanol (1:6) to give the pure crystals of Quinomycin B as white needles melting at 220.5 to 221.5° C. (decomp.).

EXAMPLE 2

A nutrient medium is prepared from the following materials:

| | Grams per litre |
|---|---|
| L-glutamic acid | 2.00 |
| Sucrose | 20.00 |
| Dipotassium phosphate | 1.00 |
| Magnesium sulfate | 0.245 |
| Zinc sulfate | 0.290 |
| Calcium chloride | 0.030 |
| pH adjusted to 7.2 | |

After sterilizing for 20 minutes at 120° C., the nutrient medium is inoculum prepared in Example 1 at a ratio of 4.5 milligrams per millilitre and agitated for 24 hours at 27 to 28° C. under aeration. To the resultant nutrient medium, there is added DL-isoleucine at a ratio of 120 $\gamma$ per millilitre, and the cultivation is further continued. The antibiotic concentration in the fermentation broth reaches around 550 $\gamma$ per millilitre 180 hours after the start of cultivation.

The antibiotic Quinomycin B is recovered from the fermentation broth as in Example 1.

Modifications may be made in carrying out the present invention without departing from the spirit and scope thereof, and I am to be limited only by the appended claims.

I claim:

1. A process for producing the antibiotic, Quinomycin B, which comprises cultivating a strain of Streptomyces Number 1752 (ATCC No. 14892) in an aqueous nutrient medium containing isoleucine under aerobic conditions, and recovering the accumulated antibiotic from the fermentation broth.

2. A process for producing the antibiotic, Quinomycin B, which comprises cultivating a strain of Streptomyces Number 1752 (ATCC No. 14892) in an aqueous nutrient medium containing isoleucine under submerged aerobic conditions at a temperature of from about 25 to about 30° C. for a period of from about 100 to about 300 hours.

3. A process for producing the antibiotic, Quinomycin B, which comprises cultivating a strain of Streptomyces Number 1752 (ATCC No. 14892) in an aqueous nutrient medium containing isoleucine at a ratio of from about 50 to about 250 γ per millilitre under aerobic conditions, and recovering the accumulated antibiotic from the fermentation broth.

4. A process for producing the antibiotic, Quinomycin B, which comprises cultivating a strain of Streptomyces Number 1752 (ATCC No. 14892) in an aqueous nutrient medium containing isoleucine at a ratio of from about 50 to about 250 γ per millilitre under submerged aerobic conditions at a temperature of from about 25 to about 30° C. for a period of from about 100 to about 300 hours.

5. A process for producing the antibiotic, Quinomycin B, which comprises cultivating a strain of Streptomyces Number 1752 (ATCC No. 14892) in an aqueous nutrient medium containing isoleucine under submerged aerobic conditions, filtering the fermentation broth and extracting the filtrate broth with a water-immiscible organic solvent.

6. A process for producing the antibiotic, Quinomycin B, which comprises cultivating a strain of Streptomyces Number 1752 (ATCC No. 14892) in an aqueous nutrient medium containing isoleucine under submerged aerobic conditions, filtering the fermentation broth and extracting the collected mycelium with a water-immiscible organic solvent.

7. A process for producing the antibiotic, Quinomycin B, which comprises cultivating a strain of Streptomyces Number 1752 (ATCC No. 14892) in an aqueous nutrient medium containing isoleucine under submerged aerobic conditions, filtering the fermentation broth and extracting the collected mycelium with a water-miscible organic solvent.

8. A process for recovering the antibiotic, Quinomycin B, from a fermentation broth containing Quinomycin B and isoleucine which comprises extracting the fermentation broth with a Quinomycin B-dissolving organic solvent, adding a petrolic solvent to the extract whereby the antibiotic is precipitated and collecting the precipitate.

9. A process according to claim 8, wherein the fermentation broth is obtained by culturing Streptomyces 1752 (ATCC No. 14892) in an aqueous nutrient medium containing isoleucine under submerged aerobic conditions.

References Cited

Antimicrobial Agents and Chemotherapy, 1961, pp. 162–168.

J. Antibiotics (Tokyo) Ser. A 14, 324, 330, 335 (1961).

SAM ROSEN, *Primary Examiner.*

JULIAN S. LEVITT, *Examiner.*